United States Patent [19]

Harris et al.

[11] Patent Number: 4,799,550

[45] Date of Patent: Jan. 24, 1989

[54] SUBTERRANEAN FORMATION TREATING WITH DELAYED CROSSLINKING GEL FLUIDS

[75] Inventors: Phillip C. Harris; Joe M. Sandy, both of Duncan, Okla.

[73] Assignee: Halliburton Company, Duncan, Okla.

[21] Appl. No.: 182,625

[22] Filed: Apr. 18, 1988

[51] Int. Cl.[4] ...................... E21B 33/138; E21B 43/26
[52] U.S. Cl. .................................... 166/300; 166/294; 166/308
[58] Field of Search ............... 166/270, 294, 295, 300, 166/308; 175/72; 405/264; 252/8.551, 8.514; 523/130, 132

[56] References Cited

U.S. PATENT DOCUMENTS

| | | | |
|---|---|---|---|
| Re. 32,302 | 12/1986 | Almond et al. | 166/308 |
| 3,096,284 | 7/1963 | Slate | 252/8.551 |
| 3,740,360 | 6/1973 | Nimerick | 166/295 X |
| 3,768,566 | 10/1973 | Ely et al. | 166/308 |
| 3,888,312 | 6/1975 | Tiner et al. | 166/308 |
| 4,210,206 | 7/1980 | Ely et al. | 166/294 |
| 4,488,975 | 12/1984 | Almond | 252/8.551 |
| 4,649,999 | 3/1987 | Sandy et al. | 166/295 |
| 4,657,080 | 4/1987 | Hodge | 166/308 |
| 4,657,081 | 4/1987 | Hodge | 166/308 |

*Primary Examiner*—George A. Suchfield
*Attorney, Agent, or Firm*—Robert A. Kent

[57] ABSTRACT

A method of treating a subterranean formation with delayed crosslinking gel fluids is provided. An aqueous gel is first prepared by admixing an organic carboxylated gelling agent with an aqueous liquid. A buffer is combined with the aqueous gel in an amount sufficient to result in and maintain the pH thereof at a level of about 5 or above at ambient temperature. A zirconium IV-containing crosslinking compound is combined with the gel and the mixture is introduced into a subterranean formation whereby the mixture is heated and caused to crosslink.

20 Claims, 3 Drawing Sheets

SUBTERRANEAN FORMATION TREATING WITH DELAYED CROSSLINKING GEL FLUIDS

BACKGROUND OF THE INVENTION

1. Field of the Invention

The present invention relates generally to the treatment of subterranean formations with delayed crosslinking gel fluids, and more particularly, but not by way of limitation, to a treatment method wherein an aqueous gel fluid prepared on the surface crosslinks after being introduced into a wellbore which penetrates a subterranean formation to form a high viscosity treating fluid therein.

2. Description of the Prior Art

A variety of subterranean formation treatments utilizing crosslinked aqueous gels have been developed heretofore. For example, a well known technique for stimulating the production of oil and/or gas from a subterranean formation using a high viscosity crosslinked aqueous gel involves fracturing the formation. That is, the aqueous gel is injected down the wellbore penetrating the formation at a flow rate and pressure sufficient to develop hydraulic forces which fracture the formation. Continued pumping of the fluid containing propping agent, e.g., sand, extends the fractures and deposits the propping agent in the fractures to hold them open. Other treatments using high viscosity crosslinked aqueous gels include the temporary plugging or blocking of portions of a formation, enhancing the recovery of oil or gas from subterranean formations by the injection of high viscosity flooding fluids therein, etc.

In order to avoid the necessity of pumping crosslinked gel fluids from the surface to a subterranean formation to be treated, delayed crosslinking gel fluids have heretofore been developed. That is, instead of incurring the high surface pressures and horsepower requirements involved in pumping highly viscous crosslinked gel fluids, the crosslinking of the fluids is delayed until after the fluids have been pumped into the formation. Once in the formation, crosslinking occurs and useful high viscosity is developed.

In some applications, and particularly in carrying out subterranean formation fracturing treatments, it is highly advantageous to combine carbon dioxide with the aqueous gel fluid used. The purpose of the carbon dioxide is to reduce the water content of the treating fluid and to energize the fluid whereby upon the termination of the treatment, it readily flows back from the formation and is recovered therefrom. The particular quantity of carbon dioxide utilized with the aqueous gel fluid can range from commingled fluids containing from about 5% to about 50% by volume carbon dioxide to foamed fluids containing up to in excess of 96% by volume.

A fracturing method for stimulating subterranean formations utilizing foams comprised of aqueous gels and carbon dioxide is described in U.S. Pat. No. Re. 32,302. U.S. Pat. No. 4,488,975 is directed to a fracturing method which utilizes an aqueous gel containing a crosslinking agent and carbon dioxide. The crosslinking agent is a zirconium or aluminum chelate, and a sufficient quantity of carbon dioxide is used to reduce the pH of the aqueous gel to a level below about 5.5 whereupon crosslinking occurs. U.S. Pat. No. 4,657,081 is directed to the delayed crosslinking of a fracturing fluid comprised of an aqueous gel and carbon dioxide. A crosslinking agent is combined with a chelating agent resulting in a chelate solution having a specific pH. When combined with an aqueous gel fluid, the chelate solution causes a delayed crosslinking to take place.

By the present invention, an improved method of treating a subterranean formation with a delayed crosslinking gel is provided which can be utilized with or without carbon dioxide, and which results in the formation of crosslinked gels having good stability at high temperatures.

SUMMARY OF THE INVENTION

The present invention provides a method of treating a subterranean formation wherein an aqueous gel is first prepared by admixing an organic carboxylated gelling agent with an aqueous liquid. A buffer is combined with the aqueous gel in an amount sufficient to result in and maintain the pH thereof at a level of about 5 or above at ambient temperature. A zirconium IV-containing crosslinking compound is combined with the aqueous gel in an amount sufficient to result in the delayed crosslinking thereof, and the resulting mixture is introduced into the subterranean formation whereby the mixture is heated by the formation and thereby caused to crosslink therein.

It is, therefore, a general object of the present invention to provide a method of treating a subterranean formation with a delayed crosslinking gel fluid.

A further object of the present invention is the provision of a method of treating a subterranean formation with a delayed crosslinking gel fluid which may or may not contain carbon dioxide.

Another object of the present invention is the provision of a method of treating a subterranean formation with an aqueous gel-carbon dioxide mixture, either commingled or foam, wherein the crosslinking of the aqueous gel is delayed until after the mixture has been introduced into the wellbore penetrating the formation.

Other and further objects, features and advantages of the present invention will be readily apparent to those skilled in the art upon a reading of the description of preferred embodiments which follows.

DESCRIPTION OF THE PREFERRED EMBODIMENTS

Figure 1:
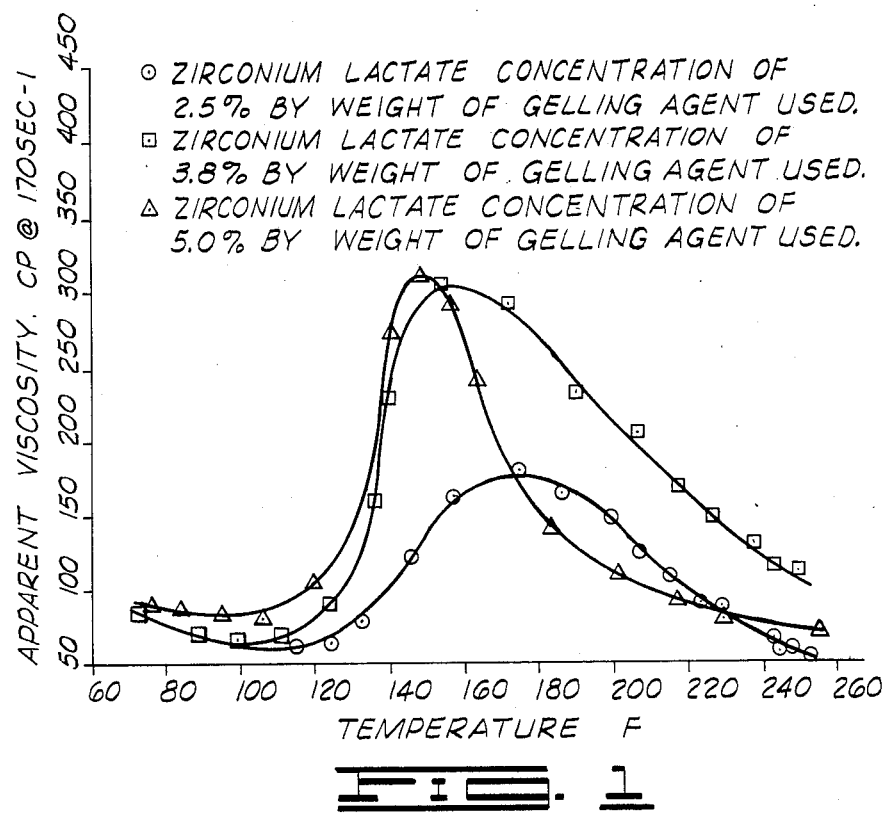
FIG. 1 is a graph of temperature versus apparent viscosity for aqueous gel fluids of the present invention containing varying amounts of crosslinking compound after the simulated introduction of the fluids into a subterranean formation.

In accordance with the method of the present invention, a delayed crosslinking gel fluid is prepared on the surface by admixing an organic carboxylated gelling agent with an aqueous liquid, combining a buffer with the resulting aqueous gel to adjust and maintain the pH thereof at a level of about 5 or above at ambient temperature, and then combining a zirconium IV-containing crosslinking compound with the aqueous gel. The crosslinking of the buffered gel by the zirconium crosslinker is delayed until the gel mixture is heated. That is, as long as the gel mixture remains at ambient temperature crosslinking only very slowly occurs. The term "ambient temperature" is used herein to mean the above freezing temperatures normally encountered on the surface. After the delayed crosslinking gel fluid has been prepared, it is introduced by way of a well bore into a subterranean formation. Because most subterranean formations are relatively hot, i.e., have temperatures in the range of from about 110° F. to 275° F., the aqueous gel fluid is heated during passage through the wellbore and in the formation. For example, upon being heated to a temperature of about 110° F. and higher, the aqueous gel rapidly crosslinks to form a highly viscous treating fluid in the wellbore or formation.

The presence of carbon dioxide in the delayed crosslinking gel fluid does not appreciably change its delayed crosslinking characteristics. With carbon dioxide included, the delayed crosslinking gel fluid is particularly suitable for use in carrying out subterranean formation fracturing procedures, both wherein the carbon dioxide is commingled with the gel fluid and where it is foamed therewith. A commingled fluid generally contains carbon dioxide in an amount of from about 5% to about 50% by volume of the fluid, and a foam contains high concentrations of carbon dioxide as the internal phase, i.e., up to in excess of 96% by volume of the fluid. In both forms of fluids, the crosslinking of the aqueous gel portions of the fluids is delayed until the fluids are heated by the formation.

The aqueous liquid can comprise substantially any aqueous liquid which does not adversely react with the components of the delayed crosslinking gel fluid. The aqueous liquid can comprise, for example, fresh water or salt solutions. Preferably, the aqueous liquid is a salt solution containing about 2% potassium chloride or other salt which functions to stabilize the formation to be treated.

The gelling agent can be any of a variety of hydratable organic carboxylated compounds. Preferably, the gelling agent is a derivatized natural material such as guar gum or cellulose containing carboxymethyl groups, e.g., carboxymethylguar, carboxymethylhydroxyethylguar, carboxymethylhydroxypropylguar, carboxymethylhydroxyethylcellulose, carboxymethylhydroxypropylcellulose, and so on. Of these, carboxymethylhydroxypropylguar and carboxymethylhydroxyethylcellulose are the most preferred.

The above-described carboxylated gelling agents are hydratable whereby they form a gel in an aqueous liquid, and when at a pH of about 5 and above, the gel is delayedly crosslinkable by a zirconium IV-containing compound to produce a crosslinked gel having good viscosity at high temperatures. More specifically, a buffer is combined with the aqueous gel formed in an amount sufficient to result in and maintain the pH of the aqueous gel at a level of about 5 or above at ambient temperature. When the crosslinking agent is combined with the aqueous gel, the crosslinking reaction that takes place is very slow at ambient temperature and therefore delayed. As indicated above, when the aqueous gel is heated by the formation, the crosslinking reaction takes place at a relatively rapid rate. While various buffers can be utilized, particularly suitable buffers are sodium diacetate and a mixture of a weak acid such as acetic acid and sodium carbonate.

Crosslinking compounds which are useful in accordance with this invention are zirconium IV (valence of +4) containing compounds which are soluble in hydrated aqueous gels and which are capable of forming a crosslinked structure with the gelling agent used. Compounds which supply zirconium IV ions are, for example, zirconium lactate, zirconium carbonate, zirconium acetylacetonate and zirconium diisopropylamine lactate. Of the foregoing compounds, zirconium lactate is preferred.

When carbon dioxide is combined with the aqueous gel mixture prior to the introduction of the mixture into the subterranean formation, the presence of the carbon dioxide lowers the pH of the aqueous gel, but does not adversely affect the delay in crosslinking of the aqueous gel or the stability of the crosslinked gel formed.

In carrying out the method of the present invention, the organic carboxylated gelling agent used, for example, carboxymethylhydroxypropylguar, is admixed with an aqueous liquid such as fresh water containing 2% by weight potassium chloride whereby the gelling agent is hydrated and an aqueous gel is formed. Generally, the gelling agent is admixed with the aqueous liquid in an amount in the range of from about 0.15% to about 1.0% by weight of the aqueous liquid, preferably in an amount of about 0.36% to about 0.60% by weight of the aqueous liquid.

A buffer, e.g., sodium di-acetate, is combined with the aqueous gel in an amount sufficient to result in and maintain the pH of the aqueous gel at a level of about 5 or above at ambient temperature. Generally, a quantity of buffer in the range of from about 0.01% to about 0.20% by weight of aqueous liquid used will be required.

The zirconium IV-containing crosslinking compound, preferably zirconium lactate because of its availability and economy, is combined with the buffered aqueous gel in an amount whereby the zirconium in the plus oxidation state is present in an amount in the range of from about 0.5% to about 7% by weight of gelling agent utilized.

When the subterranean formation to be treated has a temperature below about 200° F., the pH of the aqueous gel is preferably adjusted to a level in the range of from about 5 to about 6, and most preferably from about 5 to about 5.5 using sodium diacetate or an equivalent buffer. The crosslinking agent, e.g., zirconium lactate, is then combined with the buffered aqueous gel in an amount in the range of from about 0.5% to about 7% as zirconium (plus 4) by weight of gelling agent used. The resulting gel mixture is pumped into the formation to be treated, and upon being heated and crosslinked, the resulting crosslinked gel maintains good viscosity at temperatures up to about 200° F.

When the subterranean formation has a temperature above 200° F., a buffer comprised of a mixture of acetic acid present in an amount of about 0.015% by weight of aqueous liquid used and sodium carbonate present in an amount of about 0.12% by weight of aqueous liquid used, or the equivalent is preferably combined with the aqueous gel. The above amounts of the acetic acid-sodium carbonate buffer generally are sufficient to adjust the pH to a level in the range of from about 8 to about 10. The most preferred pH level is from about 9.5 to about 10. Zirconium lactate crosslinking agent is then combined with the buffered gel in an amount in the range of from about 2.0% to about 25% as zirconium (plus 4) by weight of gelling agent used. The crosslinked aqueous gel formed in the subterranean formation after being heated maintains good viscosity at temperatures up to about 275° F.

Carbon dioxide can be combined with the delayed crosslinking gel fluid in amounts in the range of from about 5% or that amount of carbon dioxide required to effect saturation at the existing temperature and pressure of the fluid, to in excess of 96% by volume of the aqueous gel fluid and carbon dioxide. Preferably, the carbon dioxide is combined in the liquid state with the aqueous gel on-the-fly just prior to the introduction of the resulting mixture into the well bore and subterranean formation to be treated.

In order to further illustrate the method of the present invention the following examples are given.

EXAMPLE 1

Tests were carried out using a recirculation flow loop viscometer. The viscometer is constructed of 0.305 inch ID stainless steel tubing. Fluid pressure loss is measured across a 10.0 foot section of the tubing by a Viatran 0–50 psi differential pressure transducer. Fluid is circulated with a Zenith precision metering pump. The pump allows circulation of fluid at a shear rate of 80–2000 $sec^{-1}$ in the pipe. Fluid properties may be visually observed through a lighted Penberthy sight gauge. A 0–2000 psi pressure gauge allows monitoring of system pressure. The entire length of tubing is wrapped with electrical heating tape. Power is supplied through two Honeywell temperature controllers. Thermocouples sense fluid temperature at two points in the flow loop and connect to the Honeywell controllers. System fluid pressure is controlled by a Grove backpressure regulator. The flow loop is capable of temperatures from 70° to 300° F. at pressures between ambient to 2000 psi.

Three test mixtures of delayed crosslinking gel fluids were prepared as follows. Carboxymethylhydroxyethylcellulose was admixed with fresh water having 2.7% potassium nitrate dissolved therein in a Waring Blender in an amount equivalent to 40 pounds of gelling agent per 1000 gallons of water (0.48% by weight of water). Sodium diacetate buffer in an amount equivalent to 5 pounds per 1000 gallons of water (0.04% by weight of water), and various quantities of a zirconium lactate solution containing 26% by weight zirconium lactate were combined with the aqueous gel in the blender. The pH of the three aqueous gel mixtures formed ranged from 5.18 to 5.21. The three test mixtures were individually injected into the recirculating flow loop viscometer along with a small quantity of a foaming surfactant, and while circulating, carbon dioxide was injected into the flow loop at a pressure of 1000 psig in a total quantity of 20% by volume of the circulating aqueous gel mixture and carbon dioxide. The circulating fluid was heated during each test over the temperature range of 70° F. to 250° F. Fluids were circulated at a high shear rate (500 to 1100 $sec^{-1}$) to simulate blending operations and tubing transit time (4 to 5 minutes). The shear rate was then reduced to 170 $sec^{-1}$ for the remainder of the test to simulate flow in a subterranean formation. The apparent viscosity of the circulating fluid was calculated at various temperatures over the above mentioned range. The results of the three tests are shown graphically in FIG. 1.

As shown in FIG. 1, delayed crosslinking of the fluids occurred after heating, and the particular quantity of crosslinking compound use affected the viscosity and stability of the crosslinked gel formed.

EXAMPLE 2

Figure 2:
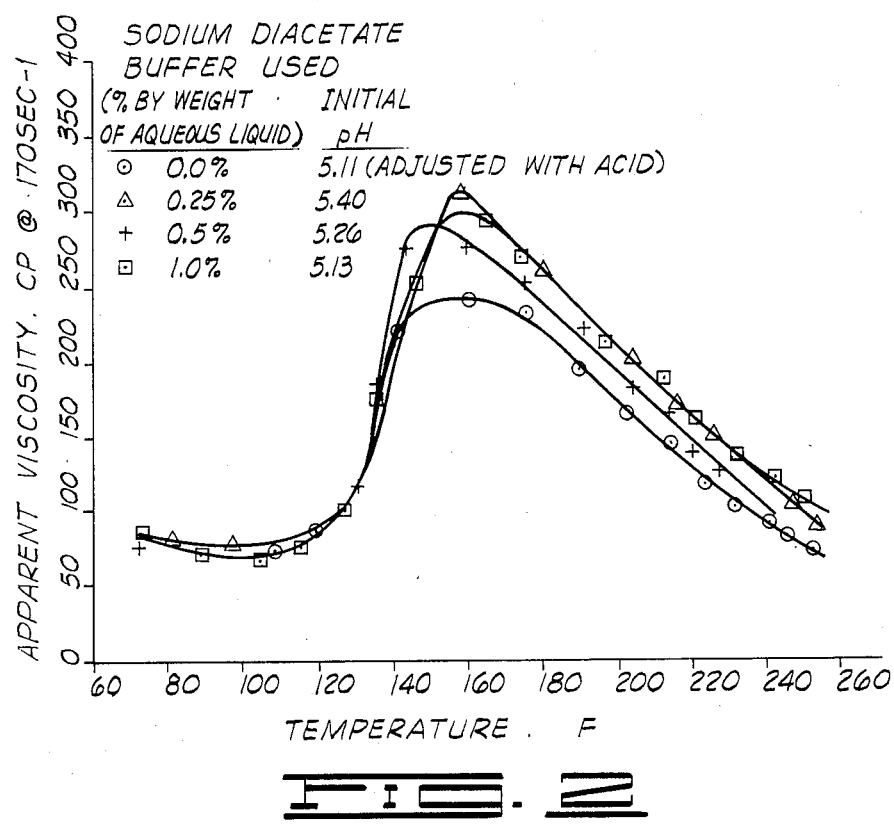
FIG. 2 is a graph similar to FIG. 1 for aqueous gel fluids of this invention containing varying amounts of a particular buffer.

Four additional tests were carried out as described in Example 1 except that the zirconium lactate solution used contained 26% by weight zirconium lactate and was combined with each of the aqueous gels formed in an amount of 0.8 gallons per 1000 gallons of water (5.0% by weight of gelling agent used). In addition, various quantities of sodium diacetate buffer were used. The results of these tests are shown in FIG. 2.

Example 3

Figure 3:
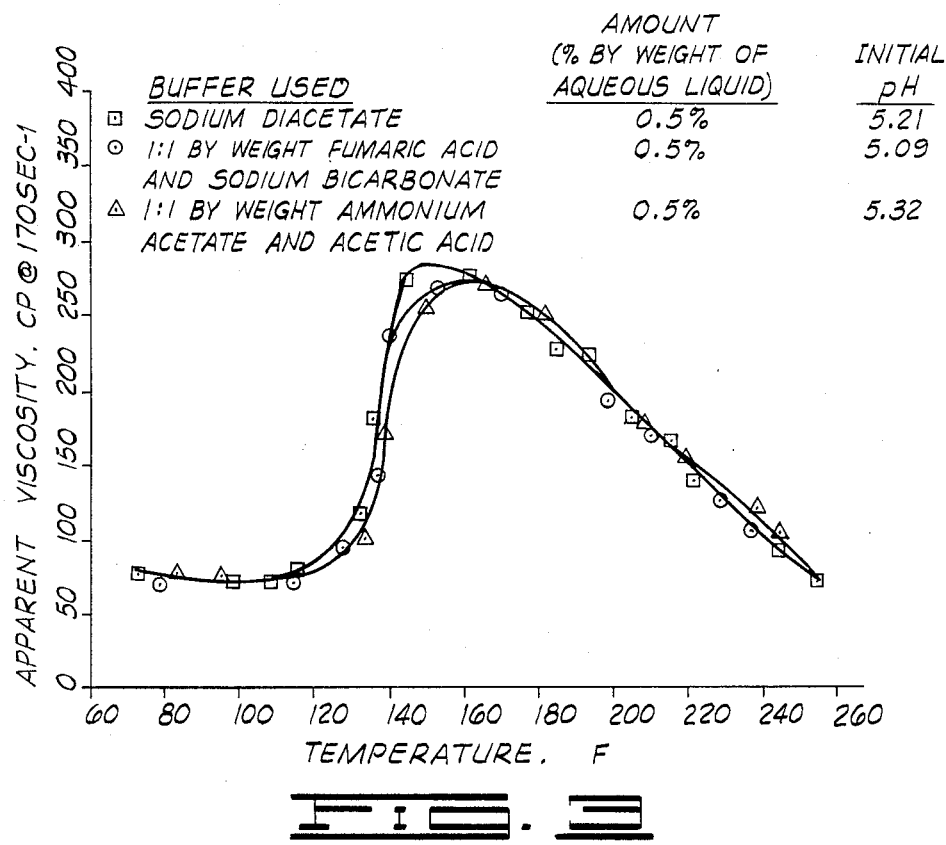
FIG. 3 is a graph similar to FIG. 1 for aqueous gel fluids of the invention containing various buffers.

Three additional tests were carried out identical to those of Example 2 except that the kind and quantity of buffer used were changed. The results of these tests are shown in FIG. 3.

Example 4

Figure 4:
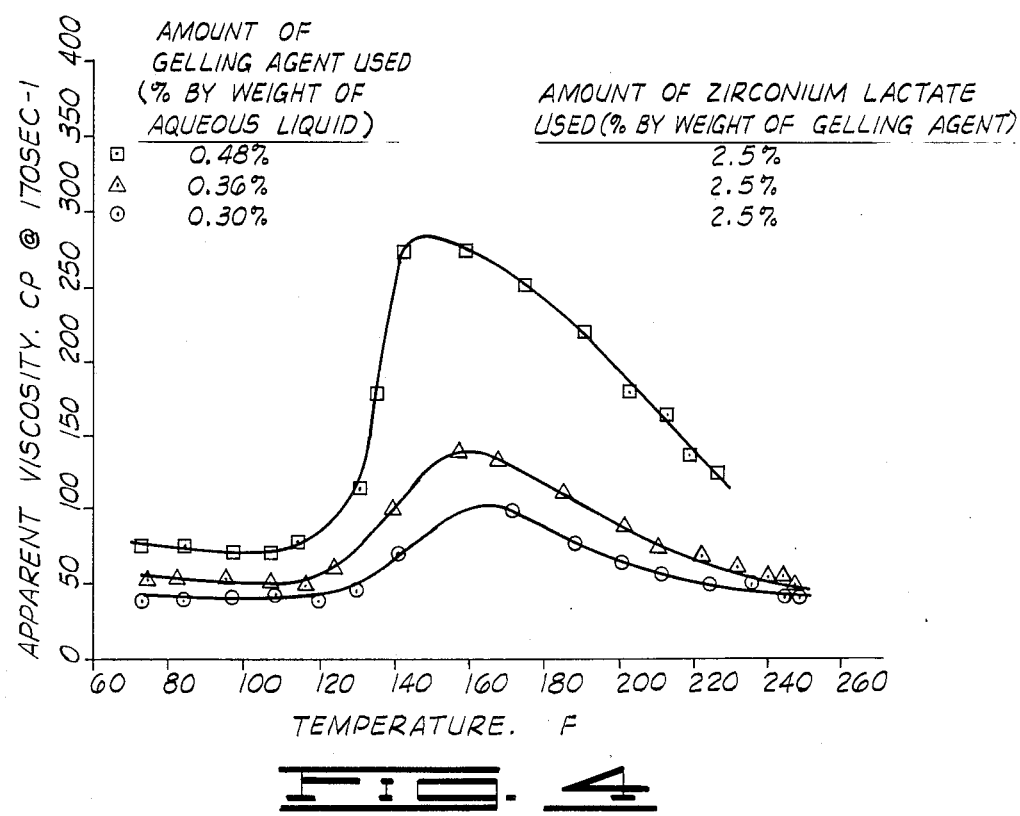
FIG. 4 is a graph similar to FIG. 1 for aqueous gel fluids of the invention containing varying amounts of gelling agent and crosslinking compound.

Three additional tests were carried out identical to the tests of Example 2 except that the sodium diacetate buffer was used in the quantity given in Example 1 and various quantities of gelling agent and crosslinking compound were used. The results of these tests are shown in FIG. 4.

Example 5

The procedure of Example 1 was repeated except that the gelling agent used was carboxymethylhydroxypropylguar in an amount of 50 pounds of gelling agent per 1000 gallons of water (0.60% by weight of water). The buffer used was a mixture of 0.015% by weight of water acetic acid and 0.12% by weight of water sodium carbonate which resulted in the test mixtures having pH levels ranging from 8.54 to 9.24 before addition of $CO_2$. Also, various amounts of crosslinking compound were used. The results of these tests are shown in FIG. 5.

Figure 5:
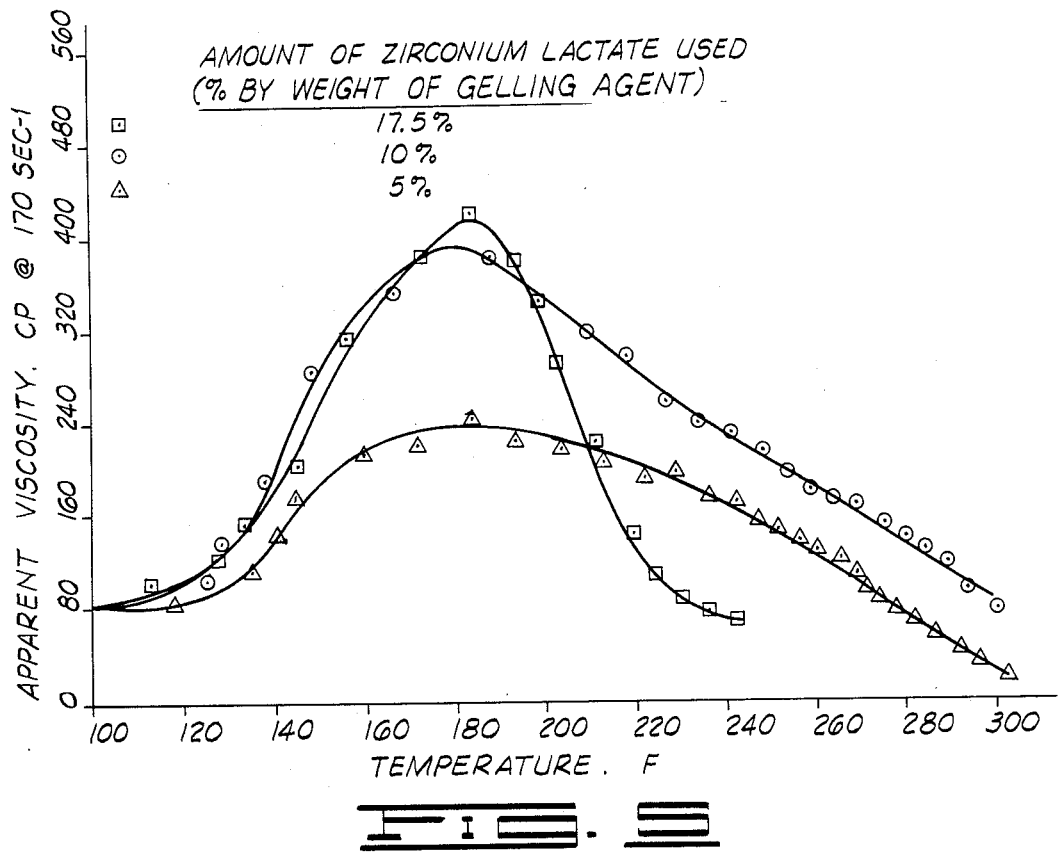
FIG. 5 is a graph similar to FIG. 1 for additional aqueous gel fluids of the invention containing varying amounts of crosslinking compound.

As illustrated in FIG. 5, the use of greater amounts of gelling agent and crosslinker compound coupled with a higher initial pH results in a delayed crosslinking gel having good viscosity up to about 275° F.

Example 6

Figure 6:
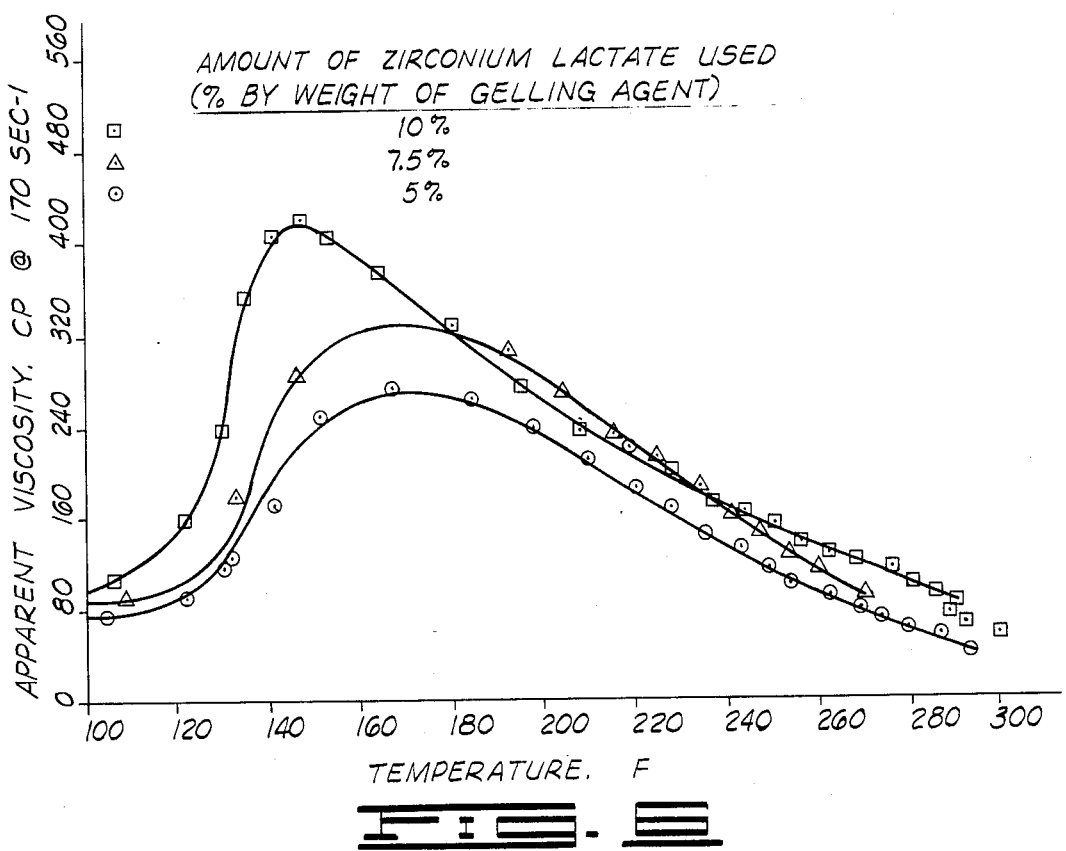
FIG. 6 is a graph similar to FIG. 1 for yet additional aqueous gel fluids of the invention containing varying amounts of crosslinking compound.

The procedure of Example 5 is repeated except that carboxymethylhydroxyethylcellulose is substituted for carboxymethylhydroxypropylguar. The results of these tests are shown in FIG. 6.

While particular embodiments of the invention have been described for purposes of this disclosure, it is to be understood that the invention is not limited to such embodiments only, and that reasonable variations and modifications which will be apparent to those skilled in the art can be made within the scope of the appended claims without departing from the spirit of the invention.

What is claimed is:

1. A method of treating a subterranean formation comprising:
   (a) preparing an aqueous gel by admixing an organic carboxylated gelling agent with an aqueous liquid;
   (b) combining a buffer with said aqueous gel in an amount sufficient to result in and maintain the pH thereof at a level of about 5 or above at ambient temperature;

(c) combining a zirconium IV-containing crosslinking compound with said aqueous gel in an amount sufficient to result in the delayed crosslinking of said gel; and (d) introducing the aqueous gel mixture formed in step (c) into said subterranean formation whereby said mixture is heated by said formation and thereby caused to crosslink therein.

2. The method of claim 1 wherein said organic carboxylated crosslinkable gelling agent is selected from the group consisting of carboxymethylhydroxypropylguar and carboxymethylhydroxyethylcellulose.

3. The method of claim 2 wherein said gelling agent is admixed with said aqueous liquid in an amount in the range of from about 0.15% to about 1.0% by weight of said aqueous liquid.

4. The method of claim 2 wherein said buffer is selected from the group consisting of sodium diacetate and a mixture of acetic acid and sodium carbonate.

5. The method of claim 4 wherein said zirconium IV-containing crosslinking compound is zirconium lactate.

6. The method of claim 5 wherein said zirconium IV-containing compound is combined with said aqueous gel in an amount whereby the zirconium is present in the plus 4 valence state in an amount in the range of from about 0.5% to about 25% by weight of gelling agent used.

7. The method of claim 1 which is further characterized to include the step of combining carbon dioxide with said aqueous gel mixture prior to introducing said mixture into said formation.

8. The method of claim 7 wherein said carbon dioxide is combined with said aqueous gel mixture in an amount in the range of from about 5% or that quantity required to effect saturation at the temperature and pressure of said mixture to in excess of about 96% by volume of the mixture of aqueous gel and carbon dioxide.

9. A method of fracturing a subterranean formation comprising:

(a) preparing an aqueous gel by admixing an organic carboxylated gelling agent with an aqueous liquid;

(b) combining a buffer with said aqueous gel in an amount sufficient to result in and maintain the pH thereof at a level of about 5 or above at ambient temperature;

(c) combining a zirconium IV-containing crosslinking compound with said aqueous gel in an amount sufficient to result in the delayed crosslinking of said gel;

(d) combining carbon dioxide with the aqueous gel mixture formed in step (c) in an amount in the range of from about 5% to about 96% by volume of the aqueous gel mixture and carbon dioxide; and (e) introducing the resulting aqueous gel mixture and carbon dioxide into said subterranean formation whereby said aqueous gel mixture is heated by said formation and thereby caused to crosslink in said formation and said formation is fractured therewith.

10. The method of claim 9 wherein said aqueous liquid is water having about 2% by weight potassium chloride dissolved therein.

11. The method of claim 10 wherein said organic carboxylated gelling agent is selected from the group consisting of carboxymethylhydroxypropylguar and carboxymethylhydroxyethylcellulose.

12. The method of claim 11 wherein said gelling agent is admixed with said aqueous liquid in an amount in the range of from about 0.15% to about 1.0% by weight of aqueous liquid.

13. The method of claim 11 wherein said buffer is sodium diacetate and the pH of said aqueous gel is in the range of from about 5 to about 6.

14. The method of claim 13 wherein said buffer is combined with said aqueous gel in an amount of about 0.01% to about 0.20% by weight of aqueous liquid used.

15. The method of claim 14 wherein said zirconium IV-containing crosslinking compound is zirconium lactate and is combined with said aqueous gel in an amount whereby the zirconium is present in the plus 4 valence state in an amount in the range of from about 0.5% to about 7% by weight of gelling agent used.

16. The method of claim 11 wherein said buffer is a mixture of acetic acid present in an amount of about 0.015% by weight of aqueous liquid used and sodium carbonate present in an amount of about 0.12% by weight of aqueous liquid used whereby the mixture results in the pH of said aqueous gel being in the range of from about 8 to about 10.

17. The method of claim 16 wherein said buffer is combined with said aqueous gel in an amount sufficient to result in and maintain the pH thereof at a level of about 9.5 to about 10.

18. The method of claim 17 wherein said zirconium IV-containing crosslinking compound is zirconium lactate and is combined with said aqueous gel in an amount whereby the zirconium is present in the plus 4 valence state in an amount in the range of from about 2% to about 25% by weight of gelling agent used.

19. A method of fracturing a subterranean formation comprising:

(a) preparing an aqueous gel by admixing a gelling agent selected from the group consisting of carboxymethylhydroxypropylguar and carboxymethylhydroxyethylcellulose with an aqueous liquid;

(b) combining a buffer with said aqueous gel in an amount sufficient to result in and maintain the pH thereof at a level of about 5 or above at ambient temperature;

(c) combining zirconium lactate with said aqueous gel in an amount sufficient to result in the delayed crosslinking of said gel;

(d) combining carbon dioxide with the aqueous gel mixture formed in step (c) in an amount in the range of from about 5% to about 96% by volume of the aqueous gel mixture and carbon dioxide; and (e) introducing the resulting aqueous gel mixture and carbon dioxide into said subterranean formation whereby said mixture is heated by said formation and thereby caused to crosslink and said formation is fractured therewith.

20. The method of claim 19 wherein said buffer is selected from the group consisting of sodium diacetate and a mixture of acetic acid and sodium carbonate.

* * * * *

UNITED STATES PATENT AND TRADEMARK OFFICE
CERTIFICATE OF CORRECTION

PATENT NO. : 4,799,550

DATED : January 24, 1989

INVENTOR(S) : Phillip C. Harris and Joe M. Sandy

It is certified that error appears in the above-identified patent and that said Letters Patent is hereby corrected as shown below:

In column 4, line 44, the word "plus" should read --plus 4--.

In column 6, line 5, the word "use" should read --used--.

Signed and Sealed this

Seventeenth Day of October, 1989

Attest:

DONALD J. QUIGG

Attesting Officer

Commissioner of Patents and Trademarks